UNITED STATES PATENT OFFICE 2,626,261

NITROTERTIARYAMINOBENZONITRILES

Raymond O. Clinton, North Greenbush, and Stanley C. Laskowski, Menands, N. Y., assignors to Sterling Drug Inc., New York, N. Y., a corporation of Delaware No Drawing. Application September 5, 1951, Serial No. 245,250

11 Claims. (Cl. 260—294.7)

This invention relates to a process of preparing 4 - nitro - 2 - (tertiary - aminoalkoxy) benzonitriles. In particular, it relates to a method of preparing these compounds by a novel rearrangement reaction of tertiary-aminoalkyl 6-nitrobenzisoxazole-3-carboxylates.

The 4-nitro-2-(tertiary-aminoalkoxy) benzonitriles that are prepared by the process of our invention have the general formula

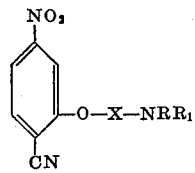

where X is a lower alkylene radical and $NRR_1$ is a tertiary-amino radical.

These nitriles are also disclosed and are claimed in our copending application Serial No. 245,243, filed September 5, 1951.

The tertiary-aminoalkyl 6-nitrobenzisoxazole-3-carboxylates used as starting materials in our process have the general formula

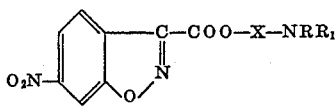

where X is a lower alkylene radical and $NRR_1$ is a tertiary-amino radical. These esters are also disclosed and are claimed in our copending application Serial No. 245,245, filed September 5, 1951.

In the above general formulas, the lower alkylene radical designated as X has preferably two to four carbon atoms and has its two free valence bonds on different carbon atoms. Thus, X includes such examples as —CH₂CH₂—,

—CH₂CH₂CH₂—

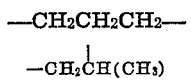

—CH₂CH₂CH₂CH₂—, —CH₂CH(CH₃)CH₂—, and the like. The tertiary-amino radical shown above as $NRR_1$ comprehends dialkylamino radicals where R and $R_1$ are lower alkyl groups, alike or different, and each alkyl group having from two to six carbon atoms, such dialkylamino radicals including diethylamino, diisopropylamino, ethyl-n-propylamino, di-n-butylamino, di-n-hexylamino, and the like. Further, the tertiary-amino radical designated as $NRR_1$ encompasses saturated N-heteromonocyclic radicals having five to six ring atoms, illustrated by examples such as 1-piperidyl; (lower alkylated)-1-piperidyl such as 2-methyl-1-piperidyl, 3-ethyl-1-piperidyl, 4-methyl-1-piperidyl, 2,6-dimethyl-1-piperidyl; 1-pyrrolidyl; (lower alkylated)-1-pyrrolidyl such as 2 - methyl - 1 - pyrrolidyl, 2,5-dimethyl-1-pyrrolidyl; 4-morpholinyl; and the like.

The process of our invention is carried out preferably by heating a tertiary-aminoalkyl 6-nitrobenzisoxazole-3-carboxylate in a non-polar solvent such as toluene, benzene, xylene, a petroleum ether fraction, etc. Although the reaction is run preferably under anhydrous conditions, it can also be run in the presence of water, as illustrated below in the examples, however, with a decrease in yield of the 4-nitro-2-(tertiary-aminoalkoxy)-benzonitriles, due to the formation of other products. Illustrative of our process is the formation of 4-nitro-2-(2-diethylaminoethoxy)benzonitrile by heating 2-diethylaminoethyl 6-nitrobenzisoxazole-3-carboxylate, preferably for a period of about twenty-four hours in toluene.

The conversion of a tertiary-aminoalkyl 6-nitrobenzisoxazole-3-carboxylate into the corresponding 4-nitro-2-(tertiary-aminoalkoxy)benzonitrile is also effected by merely allowing the tertiary-aminoalkyl 6-nitrobenzisoxazole-3-carboxylate to be exposed to air at room temperature for a week or so. However, under these mild conditions the reaction to form the corresponding 4-nitro-2-(tertiary-aminoalkoxy)benzonitrile proceeds only very slowly in low yield and is accompanied by undesirable side reactions. Thus, for better yields of the desired product the reaction is preferably carried out by heating the tertiary-aminoalkyl 6-nitrobenzisoxazole-3-carboxylate, optimally at a temperature of about 50° C. to 150° C.

Alternatively, our process can be carried out without actually isolating the tertiary-aminoalkyl 6-nitrobenzisoxazole-3-carboxylates. This is done by heating a tertiary-aminoalkanol with a lower alkyl 6-nitrobenzisoxazole-3-carboxylate, preferably the methyl ester because of its relative ease of preparation. The tertiary-aminoalkyl 6-nitrobenzisoxazole-3-carboxylate is formed first and then this ester, on continued heating, undergoes rearrangement to form the corresponding 4-nitro-2-(tertiary-aminoalkoxy)benzonitrile. As pointed out below, a heating period of about one-half hour gives optimum yields of the tertiary-aminoalkyl 6-nitrobenzisoxazole-3-carboxylate. For the best yields of the 4-nitro-2-(tertiary-aminoalkoxy)benzonitriles, a heating period of about eight to thirty-two hours is employed, however, a heating period of as low as two hours can be used but with a sacrifice in yield.

We found that 2-dimethylaminoethyl 6-nitrobenzisoxazole-3-carboxylate did not undergo our process to give the corresponding 4-nitro-2-(2-dimethylaminoethoxy)benzonitrile. Instead, only a 1,1,4,4-tetramethylpiperazinium salt of 4-nitro-2-hydroxybenzonitrile was isolated.

The intermediate tertiary-aminoalkyl 6-nitrobenzisoxazole-3-carboxylates are prepared by reacting a lower alkyl 6-nitrobenzisoxazole-3-carboxylate with a tertiary-aminoalkanol having the formula, HO—X—NRR$_1$, where X and NRR$_1$ have the meanings given hereinabove. The reaction is carried out preferably using methyl 6-nitrobenzisoxazole-3-carboxylate because of its ease of preparation. The reaction is carried out preferably by heating a mixture of methyl 6-nitrobenzisoxazole-3-carboxylate and a tertiary-aminoalkanol. Illustrative of the reaction is the formation of 2-diethylaminoethyl 6-nitrobenzisoxazole-3-carboxylate by heating methyl 6-nitrobenzisoxazole-3-carboxylate with 2-diethylaminoethanol. The reaction is carried out preferably by using a fractional distillation apparatus and a non-polar inert solvent such as benzene, toluene, xylene, a petroleum ether fraction, etc., so that heating could be stopped when the reaction was complete, as indicated by the presence of the theoretical quantity of methanol (formed by the reaction) in the distillate. The reaction will proceed even though the methanol or lower alkanol is not removed by distillation, however, with a decrease in yield of the tertiary-aminoalkyl 6-nitrobenzisoxazole-3-carboxylates. A heating period of about one-half hour gives best yields of these intermediate tertiary-aminoalkyl 6-nitrobenzisoxazole-3-carboxylates.

Specific embodiments of our invention are illustrated by the following examples.

I. *Lower alkyl 6-nitrobenzisoxazole-3-carboxylate*

Methyl 6-nitrobenzisoxazole-3-carboxylate was prepared from ethyl 2,4-dinitrophenylacetate according to the method of Borsche [Ann. 390, 1 (1912)]. In order to achieve consistently the yield of 85% reported by Borsche, it was found necessary to use freshly prepared butyl nitrite and an initial mixing temperature of 40° C. for the components. This ring closure procedure was also tried using other lower alkyl esters of 2,4-dinitrophenylacetic acid, however, with poor results. Using n-propyl, isopropyl and n-butyl esters of 2,4-dinitrophenylacetic acid, in their respective alkanols as solvents, only tarry products were obtained. Using ethyl 2,4-dinitrophenylacetate in ethanol, a yield of about 20% of ethyl 6-nitrobenzisoxazole-3-carboxylate was obtained. This ester recrystallized as yellow needles from ethanol, M. P. 99.0–100.0° C. (corr.).

Anal. calcd. for $C_{10}H_8N_2O_5$

C, 51.07; H, 3.43; $N_{NO_2}$, 5.91; $N_D$, 11.91.
Found____ C, 51.07; H, 3.35; $N_{NO_2}$, 6.04; $N_D$, 12.15.

$N_{NO_2}$ stands for nitro nitrogen as determined by titration with standard titanous chloride in glacial acetic acid solution.
$N_D$ stands for total nitrogen as determined by the Dumas method.

A better method for preparing the lower alkyl 6-nitrobenzisoxazole-3-carboxylates other than the methyl ester is afforded by the ester exchange reaction of methyl 6-nitrobenzisoxazole-3-carboxylate and the appropriate lower alkanol, as illustrated in the following preparation of ethyl 6-nitrobenzisoxazole-3-carboxylate using ethanol. A mixture of 40 g. of methyl 6-nitrobenzisoxazole-3-carboxylate, 300 ml. of anhydrous ethanol and 2 ml. of triethylamine was boiled gently for twenty minutes. The clear solution was diluted while hot with an equal volume of water, cooled, filtered and the product was washed with water. The resulting material, after drying, was again treated with anhydrous ethanol and triethylamine as before. There was thus obtained a nearly quantitative yield of ethyl 6-nitrobenzisoxazole-3-carboxylate, M. P. 99.0–100.0° C.

Following this procedure but using other lower alkanols in place of ethanol, the corresponding lower alkyl 6-nitrobenzisoxazole-3-carboxylates are formed. Thus, using n-propanol, n-butanol or isobutanol there is obtained, respectively, n-propyl 6-nitrobenzisoxazole-3-carboxylate, n-butyl 6-nitrobenzisoxazole-3-carboxylate or isobutyl 6-nitrobenzisoxazole-3-carboxylate.

II. *Tertiary-aminoalkyl 6-nitrobenzisoxazole-3-carboxylates*

Preparation of these esters, in the form of their hydrochlorides, is illustrated by the following general procedure. A mixture of 44.4 g. (0.2 mole) of methyl 6-nitrobenzisoxazole-3-carboxylate, 0.22 mole of the appropriate tertiary-aminoalkanol and 350 ml. of dry toluene was distilled slowly through a 14" vacuum-jacketed Vigreux column surmounted by a total-reflux variable take-off distillation head. During one-half hour twelve to sixteen ml. of distillate were collected, the final distillate temperature being 105° C. The pale yellow-brown still residue was decolorized using decolorizing charcoal and the toluene was removed in vacuo. The residue was dissolved in ethyl acetate and the solution was treated with an excess of 20% ethereal hydrogen chloride. The precipitated white solid was recrystallized from ethanol or isopropanol. The yields of the purified tertiary-aminoalkyl 6-nitrobenzisoxazole-3-carboxylates in the form of their hydrochlorides were 65–75%.

The same products result when the above procedure is followed but using other alkyl esters such as ethyl or n-butyl 6-nitrobenzisoxazole-3-carboxylate in place of methyl 6-nitrobenzisoxazole-3-carboxylate.

When the above procedure was followed using 2-diethylaminoethanol as the tertiary-aminoalkanol, the resulting product was 2-diethylaminoethyl 6-nitrobenzisoxazole-3-carboxylate. Use of other tertiary-aminoalkanols yield the corresponding tertiary-aminoalkyl esters in the form of their hydrochlorides as given in Table A below.

The free base form of a given ester was conveniently prepared by dissolving a portion of the hydrochloride salt in ice water and treating the solution with an excess of cooled, saturated sodium bicarbonate solution. The precipitated oily or crystalline base was taken up in cold ethyl acetate, the extract was dried and the tertiary-aminoalkyl 6-nitrobenzisoxazole-3- carboxylate was obtained by removing the ethyl acetate in vacuo.

TABLE A

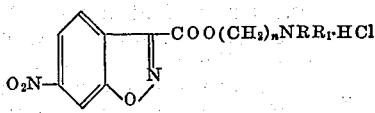

| $n$ | $NRR_1$ | M. P., °C. (corr.) | Formula | Cl Calcd. | Cl Found | $N_{NO}$ Calcd. | $N_{NO}$ Found |
|---|---|---|---|---|---|---|---|
| 2 | $N(CH_3)_2$ | a 172.0–173.0 | $C_{12}H_{13}N_3O_5 \cdot HCl$ | 11.23 | 11.22 | (b) | (b) |
| 2 | $N(C_2H_5)_2$ | a 151.8–153.0 | $C_{14}H_{17}N_3O_5 \cdot HCl$ | 10.31 | 10.32 | 4.07 | 4.04 |
| 3 | $N(C_2H_5)_2$ | 151.5–151.8 | $C_{15}H_{19}N_3O_5 \cdot HCl$ | 9.91 | 9.97 | 3.92 | 3.99 |
| 2 | $NC_5H_{10}$ c | 160.1–161.0 | $C_{15}H_{17}N_3O_5 \cdot HCl$ | 9.97 | 10.02 | 3.94 | 3.84 |
| 2 | $NC_6H_{12}$ d | a 151.0–151.5 | $C_{16}H_{19}N_3O_5 \cdot HCl$ | 9.59 | 9.69 | 3.79 | 3.74 |
| 3 | $NC_5H_{10}$ c | 189.9–190.3 | $C_{16}H_{19}N_3O_5 \cdot HCl$ | 9.59 | 9.44 | 3.79 | 3.70 |
| 3 | $NC_6H_{12}$ d | 157.8–158.7 | $C_{17}H_{21}N_3O_5 \cdot HCl$ | 9.24 | 9.20 | 3.65 | 3.63 | a With decomposition.
b Calcd.: C, 45.65; H, 4.47. Found: C, 45.74; H, 4.75.
c $NC_5H_{10}$ = 1-piperidyl.
d $NC_6H_{12}$ = 2-methyl-1-piperidyl.

Other tertiary-aminoalkyl 6-nitrobenzisoxazole-3-carboxylates, in the form of their hydrochloride addition salts, which can be prepared according to the foregoing procedure include the following: 3-(2,6-dimethyl-1-piperidyl)- propyl 6 - nitrobenzisoxazole - 3 - carboxylate; 3 - (4-morpholinyl) propyl 6-nitro-benzisoxazole-3-carboxylate; 3-(1-pyrrolidyl) propyl 6-nitro-benzisoxazole-3- carboxylate; 2-(2,5-dimethyl-1-pyrrolidyl)ethyl 6-nitrobenzisoxazole-3- carboxylate; 4-dimethylaminobutyl- 6 - nitrobenzisoxazole-3-carboxylate; 3 - dimethylamino-2-propyl 6-nitrobenzisoxazole-3-carboxylate; 2-(di-n-butylamino)ethyl 6-nitrobenzisoxazole-3-carboxylate; 2-(3-ethyl-1-piperidyl)ethyl 6-nitrobenzisoxazole-3-carboxylate; 3-(4-methyl-1-piperidyl)propyl 6-nitrobenzisoxazole-3-carboxylate; 3-(2-methyl-1-pyrrolidyl)propyl 6-nitrobenzisoxazole-3-carboxylate; and the like.

III. 4 - nitro - 2 - (tertiary-aminoalkoxy)benzonitriles from purified tertiaryaminoalkyl 6-nitrobenzisoxazole-3-carboxylates Preparation of 4-nitro-2-(tertiaryaminoalkoxy)benzonitriles from the corresponding purified tertiary-aminoalkyl 6-nitrobenzisoxazole-3-carboxylates is illustrated by the following specific examples.

4 - nitro-2-[2-(1 - piperidyl)ethoxy]benzonitrile was obtained from 2-(1-piperidyl)ethyl 6-nitrobenzisoxazole-3-carboxylate as follows: To a solution of 31.5 g. of 2-(1-piperidyl)ethyl 6-nitrobenzisoxazole-3-carboxylate hydrochloride in 400 ml. of cold water was added an excess of solid sodium bicarbonate. The precipitated base was extracted with cold toluene, and the clear pale yellow toluene solution was dried over two successive portions of anhydrous calcium sulfate at 10° C. Under these conditions no decomposition of the free base was noted. A small aliquot portion of the filtered solution was placed in a crystallizing dish and allowed to evaporate in the air (vide infra), and the remainder was refluxed under anhydrous conditions for twenty-four hours. During this entire period carbon dioxide was slowly but steadily evolved; the solution at the end of twenty-four hours was dark orange-brown in color, but clear and homogeneous. The toluene was removed in vacuo and the residual solid was recrystallized from n-heptane with decolorization. The pale yellow product was heated with 500 ml. of aqueous 4% sodium hydroxide solution in order to destroy unreacted 2-(1-piperidyl)ethyl 6-nitrobenzisoxazole-3-carboxylate. From this treatment, after recrystallization of the sodium hydroxide-insoluble material from ethyl acetate-n-hexane, was obtained at 51.7% yield of 4-nitro-2-[2-(1-piperidyl) - ethoxy]benzonitrile, M. P. 118.1–119.2° C. (cor.).

$N_{BA}$ stands for basic amino nitrogen as determined by tituration with perchloric acid in glacial acetic acid solution.

Anal. calcd. for $C_{14}H_{17}N_3O_3$ $N_{BA}$, 5.09; $N_{NO_2}$, 5.09.
Found _____ $N_{BA}$, 507; $N_{NO_2}$, 5.05.

The aliquot portion of the toluene solution which had been removed above was allowed to stand in the air for eight days. During this period the initially yellow crystalline base sintered to an orange sticky paste, then resolidified slowly to a spongy orange solid. From this material were obtained, by the procedure described below under Example IV: 4-nitro-2-[2-(1-piperidyl)ethoxy]benzonitrile (about 5% yield), isolated as the picrate, 4-nitro-2-[2-(1-piperidyl) - ethoxy]benzonitrile di-(2-cyano-5-nitrophenolate) (about 5% yield), and 2-(1-piperidyl)ethanol mono-(2-cyano-5-nitrophenolate) (about 90% yield), yellow-orange prisms from ethyl acetate-n-hexane, M. P. 85.0–86.3° C. (cor.).

Anal. calcd. for $C_{14}H_{19}N_3O_4$__$N_{BA}$, 4.78; $N_{NO_2}$, 4.78.
Found _____$N_{BA}$, 4.68; $N_{NO_2}$, 4.82.

4 - nitro - 2 - [3-(1-piperidyl)propoxy]benzonitrile, M. P. 102.2–102.8° C. (cor.), was prepared from 3-(1-piperidyl)propyl 6-nitrobenzisoxazole-3-carboxylate according to the procedure described above in the preparation of the corresponding 4-nitro-2-[2-(1-piperidyl)ethoxy]benzonitrile. A 29.5% conversion of the tertiary-aminoalkyl ester was obtained in twenty-four hours.

Anal. calcd. for $C_{15}H_{19}N_3O_3$__$N_{BA}$, 4.84; $N_{NO_2}$, 4.84.
Found _____$N_{BA}$, 4.87; $N_{NO_2}$, 4.80.

From a portion of the 3-(1-piperidyl)propyl 6-nitrobenzisoxazole-3-carboxylate which had been allowed to stand in air for eight days was isolated, according to the procedure described above, only a very small amount of 4-nitro-2-[3-(1-piperidyl)propoxy]benzonitrile, 4-nitro-2-[3-(1 - piperidyl) - propoxy]benzonitrile mono - (2-cyano-5-nitrophenolate) (about 2% yield), and 3-(1-piperidyl)propanol di-(2-cyano-5-nitrophenolate) (about 95% yield).

4 - nitro - 2 - (2 - diethylaminoethoxy)benzonitrile was obtained from 2-diethylaminoethyl 6-nitrobenzisoxazole-3-carboxylate in a 71% yield, following the above procedure described for the preparation of 4-nitro-2-[2-(1-piperidyl)ethoxy]benzonitrile. 4 - nitro - 2-(2-diethylaminoethoxy)benzonitrile, in the form of its hydrochloride salt, melted at 192.0–193.0° C. (cor.).

Anal. calcd. for $C_{13}H_{17}N_3O_3 \cdot HCl$
                           Cl, 11.83; $N_D$, 14.02.
Found _____Cl, 11.75; $N_D$, 14.02.

When 2-diethylaminoethyl 6-nitrobenzisoxazole-3-carboxylate, in the form of its free base, was allowed to stand in the air for ten days, it was converted into 4-nitro-2-(2-diethylaminoethoxy)benzonitrile (about 8% yield), 4-nitro-2 - (2 - diethylaminoethoxy)benzonitrile di - (2 - cyano-5-nitrophenolate) (about 10% yield), 2-diethylaminoethanol (about 80% yield), isolated as the picrate, and a trace of a red-colored unknown compound having a melting point of 206.0–207.0° C.

4 - nitro-2-[2-(2-methyl-1-piperidyl)ethoxy]-benzonitrile, M. P. 133.4–136.2° C. (cor.), was obtained in a yield of about 22% when the above procedure was followed but using 2-(2-methyl-1-piperidyl)ethyl 6-nitrobenzisoxazole-3-carboxylate instead of the corresponding 2-(1-piperidyl)-ethyl ester and using a one mole proportion of water in addition to the toluene.

Anal. calcd. for $C_{15}H_{19}N_3O_3$
          C, 62.26; H, 6.62; $N_{BA}$, 4.84; $N_D$, 14.52.
Found _____C, 62.38; H, 6.53; $N_{BA}$, 4.82; $N_D$, 14.24.

Also isolated from this reaction was 4-nitro-2 - [2 - (2 - methyl - 1-piperidyl)ethoxy]benzonitrile mono-(2-cyano-5-nitrophenolate) (about 10% yield) and 2-(2-methyl-1-piperidyl)ethanol (about 6% yield), isolated as the picrate.

When the above procedure for the preparation of 4-nitro-2-[2-(1-piperidyl)ethoxy]benzonitrile was followed but using the appropriate tertiary-aminoalkyl 6-nitrobenzisoxazole-3-carboxylate in place of the 2-(1-piperidyl)-ethyl ester, there was obtained the corresponding 4-nitro-2-(tertiary-aminoalkoxy)benzonitrile given in Table B.

TABLE B

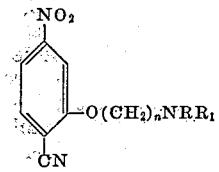

| n | $NRR_1$ | M. P., °C. (corr.) | Formula | Analysis, Percent | | | |
|---|---|---|---|---|---|---|---|
| | | | | $N_{BA}$ | | $N_{NO_2}$ | |
| | | | | Calcd. | Found | Calcd. | Found |
| 3 | $N(C_2H_5)_2$ | 53.6–55.0 | $C_{14}H_{19}N_3O_3$ | 5.05 | 5.04 | 5.05 | 4.92 |
| 2 | $NC_7H_{14}$[a] | 132.9–133.8 | $C_{16}H_{21}N_3O_3$ | 4.62 | 4.65 | 4.62 | 4.76 |
| 3 | $NC_6H_{12}$[b] | 92.5–93.5 | $C_{16}H_{21}N_3O_3$ | 4.62 | 4.64 | 4.62 | 4.70 |
| 2 | $NC_4H_8O$[c] | 126.5–127.5 | $C_{13}H_{15}N_3O_4$ | 5.05 | 5.07 | 5.05 | 5.05 |
| 3 | $NC_4H_8O$[c] | 110.0–111.5 | $C_{14}H_{17}N_3O_4$ | 4.81 | 4.82 | 4.81 | 4.80 |

[a] $NC_7H_{14}=$ 2,6-dimethyl-1-piperidyl.
[b] $NC_6H_{12}=$ 2-methyl-1-piperidyl.
[c] $NC_4H_8O=$ 4-morpholinyl.

Hydrochloride addition salts of the above 4-nitro-2-(tertiary-aminoalkoxy)benzonitriles are given in Table C.

TABLE C

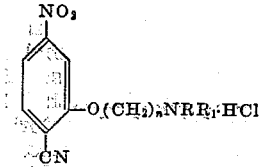

| n | $NRR_1$ | M. P., °C. (corr.) | Formula | Analyses, Percent | | | |
|---|---|---|---|---|---|---|---|
| | | | | Cl. | | $N_{NO_2}$ | |
| | | | | Calcd. | Found | Calcd. | Found |
| 3 | $N(C_2H_5)_2$ | 210.2–210.9 | $C_{14}H_{19}N_3O_3 \cdot HCl$ | 11.30 | 11.30 | 4.46 | 4.58 |
| 2 | $NC_5H_{10}$[a] | (b) | $C_{14}H_{17}N_3O_3 \cdot HCl$ | 11.37 | 11.33 | 4.49 | 4.64 |
| 2 | $NC_6H_{12}$[c] | 192.7–193.7 | $C_{15}H_{19}N_3O_3 \cdot HCl$ | 10.88 | 10.80 | [d]12.90 | [d]13.04 |
| 2 | $NC_7H_{14}$[e] | 214.6–215.3 | $C_{16}H_{21}N_3O_3 \cdot HCl$ | 10.43 | 10.30 | 4.12 | 4.26 |
| 3 | $NC_5H_{10}$[a] | 194.0–194.9 | $C_{15}H_{19}N_3O_3 \cdot HCl$ | 10.88 | 10.83 | 4.30 | 4.30 |
| 3 | $NC_6H_{12}$[c] | 187.1–188.0 | $C_{16}H_{21}N_3O_3 \cdot HCl$ | 10.43 | 10.27 | [d]12.37 | [d]12.12 |
| 2 | $NC_4H_8O$[f] | 214.6–215.5 | $C_{13}H_{15}N_3O_4 \cdot HCl$ | 11.30 | 11.31 | 4.47 | 4.35 |
| 3 | $NC_4H_8O$[f] | 215.0–215.8 | $C_{14}H_{17}N_3O_4 \cdot HCl$ | 10.82 | 10.85 | 4.27 | 4.19 |

[a] $NC_5H_{10}=$ 1-piperidyl.
[b] Sintered at 197° C., slowly decomposed and turned black above 199° C.
[c] $NC_6H_{12}=$ 2-methyl-1-piperidyl.
[d] Total nitrogen by the Dumas method ($N_D$).
[e] $NC_7H_{14}=$ 2,6-dimethyl-1-piperidyl.
[f] $NC_4H_8O=$ 4-morpholinyl.

Other 4-nitro-2-(tertiary-aminoalkoxy)benzonitriles which can be prepared according to the foregoing procedure using the appropriate tertiary-aminoalkyl 6-nitrobenzisoxazole-6-carboxylate include the following: 4-nitro-2-[3-(1-pyrrolidyl)propoxy]benzonitrile; 4-nitro-2-[2-(2,5-dimethyl-1-pyrrolidyl)ethoxy]benzonitrile; 4-nitro-2-(4-diethylaminobutoxy)benzonitrile; 4-nitro-2-[2-(di-n-butylamino)ethoxy]benzonitrile; 4-nitro-2-[3-(4-methyl-1-piperidyl)propoxy]-benzonitrile; 4-nitro-2-[2-(3-ethyl-1-piperidyl)-ethoxy]benzonitrile; 4-nitro-2-[3-(2-methyl-1-pyrrolidyl)propoxy]benzonitrile; and the like.

IV. *4-nitro-2-(tertiary-aminoalkoxy)benzonitriles without isolating the tertiary-aminoalkyl 6-nitrobenzisoxazole-3-carboxylates*

The 4-nitro-2-(tertiary-aminoalkoxy)benzonitriles are also formed by heating a lower alkyl 6-nitrobenzisoxazole-3-carboxylate, preferably the methyl ester, with a tertiary-aminoalkanol, without isolating the intermediate tertiary-aminoalkyl 6-nitrobenzisoxazole-3-carboxylate thereby formed. This procedure is illustrated using the following tertiary-aminoalkanols.

*2-diethylaminoethanol.*—A mixture of 66.6 g. (0.30 mole) of dry methyl 6-nitrobenzisoxazole-3-carboxylate, 38.7 g. (0.33 mole) of 2-diethylaminoethanol and 1200 ml. of dry toluene was distilled slowly through a 14″ vacuum-jacketed Vigreux column surmounted by a total-reflux variable take-off distillation head. A total of 300 ml. of distillate was collected during seven hours. The evolved gases were trapped and tested; carbon dioxide was shown to be evolving steadily throughout the reaction, but carbon monoxide and unsaturates were absent. During this distillation the still contents darkened to brown. The toluene was removed from the still residue in vacuo and the residual yellow-brown solid was treated as follows:

A weighed portion was extracted several times with hot n-heptane and the combined n-heptane extracts were decolorized and cooled. The crystalline product, after several recrystallizations from absolute alcohol, formed shiny yellow plates, M. P. 104.5–105.5° C. The compound was stable towards hot 4% aqueous sodium hydroxide solution (differentiation from methyl 6-nitrobenzisoxazole-3-carboxylate or 2-diethylaminoethyl 6-nitrobenzisoxazole-3-carboxylate) and readily gave a crystalline picrate (M. P. 170.1–170.8° C.) and hydrochloride (M. P. 193.0–194.0° C.). A mixed M. P. of the pure base with pure 4-nitro-2-(2-diethylaminoethoxy)benzonitrile, prepared as above in Example III, showed no depression. Similarly, the mixed melting points of the corresponding picrates and hydrochlorides were undepressed.

Anal. calcd. for $C_{13}H_{17}N_3O_3$: C, 59.30; H, 6.51; $N_{NO_2}$, 5.32; $N_{BA}$, 5.32; mol. wt. 263.

Found: C, 59.43; H, 6.55; $N_{NO_2}$, 5.32; $N_{BA}$, 5.28; mol. wt. (cryoscopic in dioxane), 271. The weight of 4-nitro-2-(2-diethylaminoethoxy)benzonitrile obtained corresponded to a 67% conversion of the methyl 6-nitrobenzisoxazole-3-carboxylate.

A twenty gram portion of the above residual yellow-brown solid was allowed to stand at room temperature in the open air for eight days. The solid material slowly sintered to a sticky, bright orange paste. The material was extracted three times with boiling n-heptane (from the n-heptane extracts was recovered 13.6 g. of pure 4-nitro-2-(2-diethylaminoethoxy)benzonitrile). The n-heptane-insoluble material was suspended in warm ethyl acetate and the insoluble red precipitate was removed by filtration. The ethyl acetate solution was decolorized and cooled well in ice. The resulting crystalline precipitate was collected and washed thoroughly with a cold one to one mixture of n-hexane-ethyl acetate. Further recrystallization from an ethyl acetate-n-hexane mixture gave 4.2 g. of 4-nitro-2-(2-diethylaminoethoxy)benzonitrile di-(2-cyano-5-nitrophenolate), crystallizing in rosets of brilliant yellow-orange needles, M. P. 146.9–147.4° C. When mixed with a synthetic sample of 4-nitro-2-(2-diethylaminoethoxy)benzonitrile di-(2-cyano-5-nitrophenolate), this product (orange-yellow needles) gave no depression of melting point.

The solution in ethyl acetate when treated with ethereal hydrogen chloride yielded crystalline 4-nitro-2-(2-diethylaminoethoxy)benzonitrile hydrochloride, M. P. 193.2–194.4° C., which showed no depression of melting point on admixture with a sample of 4-nitro-2-(2-diethylaminoethoxy)-benzonitrile hydrochloride obtained as shown hereinabove. From the mother liquors from this treatment was isolated a compound melting at 161–162° C. This compound was 4-nitro-2-hydroxybenzonitrile since it showed no M. P. depression on admixture with a sample of pure 4-nitro-2-hydroxybenzonitrile.

A further portion of the original yellow-brown reaction product was powdered and extracted several times with warm 15% aqueous sodium bisulfite solution. From the solution was recovered, by treatment with 35% aqueous sodium hydroxide solution, pure 4-nitro-2-(2-diethylaminoethoxy)benzonitrile. The insoluble material was dried, extracted several times with boiling ethyl acetate (extracts discarded) and recrystallized from hot water. The product crystallized in white cottony needles, M. P. 220.2–220.6° (dec.). A mixed melting point with a synthetic specimen of 4-nitro-2-(2-diethylaminoethoxy)benzonitrile bisulfite, prepared from the base, sodium bisulfite solution and a few drops of acetic acid, showed no depression.

Anal. calcd. for $C_{13}H_{19}N_3O_6S$
C, 45.21; H, 5.54; $N_{BA}$, 4.06; $N_D$, 12.17; S, 9.28.
Found
C, 45.58; H, 5.46; $N_{BA}$, 3.85; $N_D$, 12.07; S, 9.48.

*3-(2-methyl-1-piperidyl)propanol.*—A mixture of 44.4 g. (0.20 mole) of methyl 6-nitrobenzisoxazole-3-carboxylate, 39.2 g. (0.25 mole) of redistilled 3-(2-methyl-1-piperidyl)propanol and 350 ml. of dry toluene was refluxed with slow distillation (vide supra) for six hours. The toluene was removed from the dark brown still contents in vacuo, and the residual brown oil was triturated with several portions of n-pentane (the insoluble portion was shown to be methyl 6-nitrobenzisoxazole-3-carboxylate).

A portion of the n-pentane solution on evaporation, followed by recrystallization of the residual solid several times from n-hexane with decolorization, gave a yield of about 15% of a compound crystallizing in pale yellow leaflets, M. P. 93.1–93.9°. The mixed melting point with pure 4-nitro-2-[3-(2-methyl-1-piperidyl)propoxy]-benzonitrile, prepared above in Example III, was undepressed, and the mixed melting point of the corresponding picrates showed no depression.

Anal. calcd. for $C_{16}H_{21}N_3O_3$__$N_{NO_2}$, 4.62; $N_{BA}$, 4.62.
Found_____$N_{NO_2}$, 4.72; $N_{BA}$, 4.63.

A further portion of the n-pentane solution was evaporated to dryness and the residual crude solid was allowed to stand in the open air at room temperature for eight days. The spongy resinous orange solid was then extracted several times with hot n-hexane (extracts discarded). The insoluble material was dissolved in ethyl acetate and the solution was decolorized. A small portion of this solution on treatment with an equal volume of n-hexane gave an orange precipitate. The latter, when recrystallized from a small volume of ethyl acetate, formed orange needles melting at 131.6–132.8° and showing no depression of melting point on admixture with a synthetic sample of 4-nitro-2-[3-(2-methyl-1-piperidyl)-propoxy]benzonitrile mono-(2-cyano-5-nitrophenolate). Further, treatment of this orange solid with ethereal hydrogen chloride yielded pure 4-nitro-2-[3-(2-methyl-1-piperidyl)propoxy]-benzonitrile hydrochloride and pure 4-nitro-2-hydroxybenzonitrile, as shown by mixed melting points.

*2-(1-piperidyl)ethanol.* — This reaction was carried out in the manner described above for 2-diethylaminoethanol. The reaction products were isolated by similar methods. In each case the structures were shown by analyses, by degradation, and by mixed melting points with synthetic samples. There were obtained: 4-nitro-2-[2-(1-piperidyl)ethoxy]benzonitrile, in amount corresponding to a 38% conversion of methyl 6-nitrobenzisoxazole-3-carboxylate, and 4-nitro-2-[2-(1-piperidyl)ethoxy]benzonitrile di-(2-cyano-5-nitrophenolate), from moisture degradation of the crude reaction product.

The foregoing procedure of heating a lower alkyl 6-nitrobenzisoxazole-3-carboxylate with a tertiary-aminoalkanol can be carried out using other tertiary-aminoalkanols in addition to the ones shown above in the specific illustrations. Thus, by heating methyl or ethyl 6-nitrobenzisoxazole-3-carboxylate with 3-(1-pyrrolidyl)propanol, 2-(2,5-dimethyl-1-pyrrolidyl)ethanol, 4-diethylaminobutanol, 2-di-n-butylaminoethanol or 3-(2-methyl-1-pyrrolidyl)-propanol, there is obtained, respectively, 4-nitro-2-[3-(1-pyrrolidyl)-propoxy]benzonitrile, 4-nitro-2-[2-(2,5-dimethyl-1-pyrrolidyl)ethoxy]benzonitrile, 4-nitro-2-(4-diethylaminobutoxy)benzonitrile, 4-nitro-2-(2-di-n-butylaminoethoxy)benzonitrile or 4-nitro-2-[3-(2-methyl-1-pyrrolidyl)propoxy]benzonitrile.

We claim:

1. The process of preparing a compound having the formula

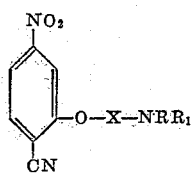

where X is a lower alkylene radical whose two free valence bonds are on different carbon atoms and $NRR_1$ is a member of the group consisting of lower dialkylamino where each alkyl radical has from two to six carbon atoms, 1-piperidyl, (lower alkylated)-1-piperidyl, 1-pyrrolidyl, (lower alkylated)-1-pyrrolidyl and 4-morpholinyl, which comprises heating a tertiary-aminoalkyl 6-nitrobenzisoxazole-3-carboxylate having the formula

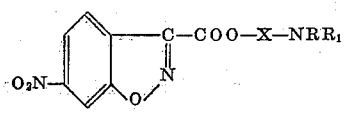

2. The process of preparing a compound having the formula

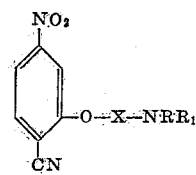

where X is a lower alkylene radical whose two free valence bonds are on different carbon atoms and $NRR_1$ is a (lower alkylated)-1-piperidyl radical, which comprises heating a tertiary-aminoalkyl 6-nitrobenzisoxazole-3-carboxylate having the formula

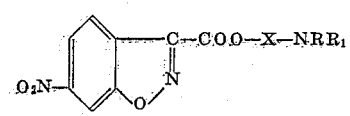

3. The process of preparing a compound having the formula

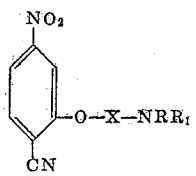

where X is a lower alkylene radical whose two free valence bonds are on different carbon atoms and $NRR_1$ is a 2-methyl-1-piperidyl radical, which comprises heating a tertiary-aminoalkyl 6-nitrobenzisoxazole-3-carboxylate having the formula

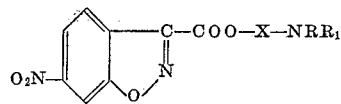

4. The process of preparing a compound having the formula

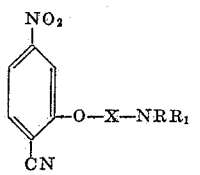

where X is a lower alkylene radical whose two free valence bonds are on different carbon atoms and $NRR_1$ is a 1-piperidyl radical, which comprises heating a tertiary-aminoalkyl 6-nitrobenzisoxazole-3-carboxylate having the formula

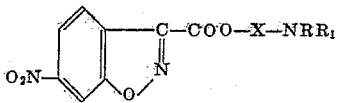

5. The process of preparing a compound having the formula

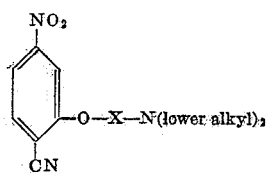

where X is a lower alkylene radical whose two free valence bonds are on different carbon atoms and each lower alkyl radical has from two to six carbon atoms, which comprises heating a dialkylaminoalkyl 6-nitrobenzisoxazole-3-carboxylate having the formula

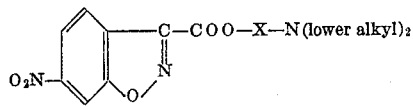

6. The process of preparing a compound having the formula

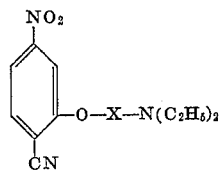

where X is a lower alkylene radical whose two free valence bonds are on different carbon atoms, which comprises heating a diethylaminoalkyl 6-nitrobenzisoxazole-3-carboxylate having the formula

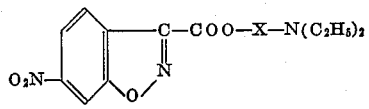

7. The process of preparing 4-nitro-2-(2-diethylaminoethoxy)benzonitrile which comprises heating 2-diethylaminoethyl 6-nitrobenzisoxazole-3-carboxylate.

8. The process of preparing 4-nitro-2-(3-diethylaminopropoxy)benzonitrile which comprises heating 3-diethylaminopropyl 6-nitrobenzisoxazole-3-carboxylate.

9. The process of preparing 4-nitro-2-[2-(1-piperidyl)ethoxy]benzonitrile which comprises heating 2-(1-piperidyl)ethyl 6-nitrobenzisoxazole-3-carboxylate.

10. The process of preparing 4-nitro-2-[3-(1-piperidyl)propoxy]benzonitrile which comprises heating 3-(1-piperidyl)propyl 6-nitrobenzisoxazole-3-carboxylate.

11. The process of preparing 4-nitro-2-[2-(2-methyl-1-piperidyl)ethoxy]benzonitrile which comprises heating 2-(2-methyl-1-piperidyl)ethyl 6-nitrobenzisoxazole-3-carboxylate.

RAYMOND O. CLINTON.
STANLEY C. LASKOWSKI.

No references cited.